July 3, 1962 K. G. E. DERMAN ET AL 3,042,417
CENTRIFUGAL SEAL
Filed Feb. 20, 1959
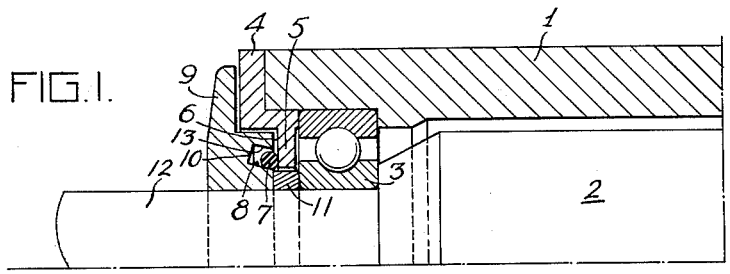
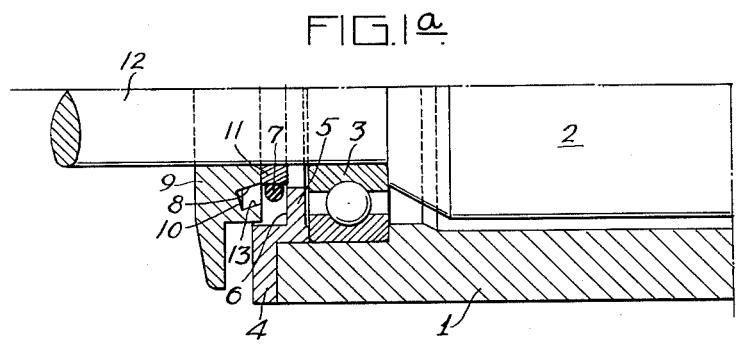
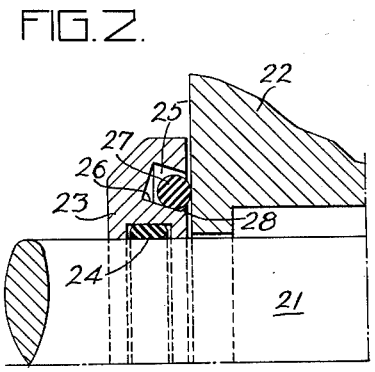
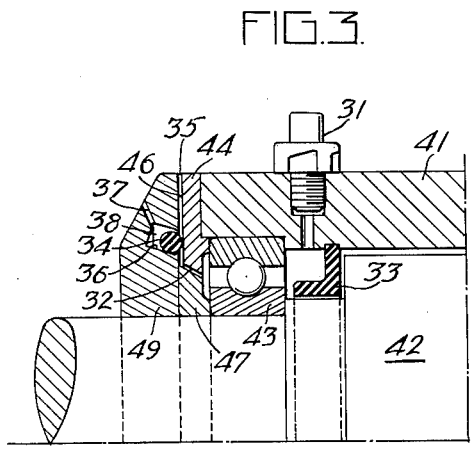
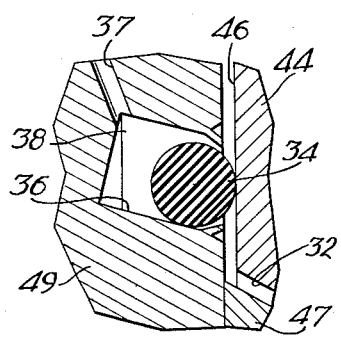
Inventors.
Karl Gustav Einar Derman
Nils Bertil Reinhold Snare
By Howson & Howson
Attys

United States Patent Office 3,042,417
Patented July 3, 1962

3,042,417
CENTRIFUGAL SEAL
Karl Gustav Einar Derman, Savedalen, and Nils Bertil Reinhold Snare, Goteborg, Sweden, assignors to Aktiebolaget Svenska Kullagerfabriken, Goteborg, Sweden, a corporation of Sweden
Filed Feb. 20, 1959, Ser. No. 794,580
Claims priority, application Sweden Feb. 24, 1958
9 Claims. (Cl. 277—25)

The present invention relates to centrifugal seals and, has particular application to a seal embodying an O-ring or the like which seals between two relatively rotatable members while the same are stationary or rotating at low speeds and which disengages upon rotation at a given rotary speed.

Prior to the present invention, it has been usual to use various forms of labyrinth seals and non-contact seals for the bearings of high-speed machines in which contact seals cannot be used because of the heat which they generate when running at high peripheral speeds. The sealing capacity of prior seals has been good when the machine in which they are mounted is running at high speeds, but has not been sufficiently effective when the machine is stationary and during the starting-up period. Due to the pumping effect which is created at high rotational speeds, a certain amount of subpressure is created in the bearing housings. When the speed is retarded, this pumping effect decreases, and air is drawn into the bearing carrying with it moisture and particles of dust which cause damage to the bearings. This also occurs, and to an even greater extent, when a stationary bearing cools off from the higher temperature it had during running.

An improved form of seal of the general type mentioned above is the so-called centrifugal seal which may, for instance, consist of a slightly cupped elastic disc, the outer edge of which engages a surface perpendicular to the axis of rotation when the machine is stationary or rotates at low speed. At high speeds the disk flattens out due to centrifugal forces, and its edge is removed from contact with the engaging surface. The sealing capacity of a disk of this kind bears a certain relationship to the contact pressure which decreases as the disk becomes worn, thereby decreasing its sealing capacity.

The present invention relates to a centrifugal seal between a preferably stationary member and another member rotatable thereto. It has most of the advantages of known centrifugal seals but does not suffer from the disadvantage mentioned above.

With the foregoing in mind the primary object of the present invention is to provide an improved centrifugal seal embodying an O-ring or the like for sealing at low speeds, and which disengages the members at high speeds, to thereby reduce wear on the sealing member.

The present invention also provides a seal in which wear on the sealing member does not have a substantially adverse effect on the sealing assembly.

These and other objects of the invention are more fully set forth hereinafter with reference to the accompanying drawing illustrating three forms of the invention, in which FIG. 1 shows a seal of the present invention mounted at one end of a grinding wheel spindle with the seal in sealing position;

FIG. 1a shows the seal of FIG. 1 before the mounting is completed;

FIG. 2 shows a separate sealing unit mounted on a shaft and sealing against a wall penetrated by the shaft;

FIG. 3 shows a portion of a seal which also serves as a grease valve; and

FIG. 3a shows on an enlarged scale a portion of the seal shown in FIG. 3.

In FIG. 1 the numeral 1 designates the housing of a grinding wheel spindle 2, carried in a deep-groove ball bearing 3. The bearing is retained in position by a cover 4, the inner portion 5 of which has an outer axial end plane 6, which is preferably a ground or polished surface. An O-ring sealing element 7 is mounted under its own tension on a frusto-conical surface 8 which forms the inner wall of an annular groove 10 formed co-axially in the inner axial end wall of a sealing member 9. Preferably the groove 10 is formed by radially-spaced parallel co-axial frusto-conical walls, designated 8 and 13, respectively. The axial component of the reaction from the frusto-conical wall urges the O-ring against the surface 6 with a pressure determined by the tension in the ring and the taper of the frusto-conical wall.

To facilitate the assembly of the seal, a ring 11 is mounted on a reduced portion 12 of the spindle between the inner ring of the bearing 3 and the sealing member 9. The cylindrical surface of the ring 11 centers the O-ring and maintains it in registry with the groove 10. When assembling the seal, the O-ring is mounted as shown in FIG. 1a on the ring 11, the outer cylindrical surface of which is of substantially the same diameter as the small end of the frusto-conical wall 8, i.e., the end which confronts the bearing, after which the sealing member 9 is moved axially into sealing position. The O-ring is thus forced up onto the frusto-conical surface 8 and will engage the surface 6 as explained above, thus forming a seal. This is the position assumed by the O-ring when the spindle is stationary or rotates at low speed. In the operation of the seal, when the speed of the spindle reaches a certain value, the centrifugal forces acting on the O-ring will balance the pressure exerted by the tension of the ring on the frusto-conical surface 8, and when the speed is still further increased, the O-ring will be further expanded until it comes into contact with the outer frusto-conical surface 13 of the groove 10. The O-ring will then be forced away out of contact with the surface 6 by the frusto-conical wall 13, and all sliding contact will cease and the device will function in a manner similar to the usual labyrinth or non-contacting seal. Thus the seal is a contact seal when stationary or running at low speeds but is converted automatically into a non-contact seal at higher speeds. It thus has the advantage of both types of seal, without their disadvantages.

In FIG. 2 the numeral 21 designates a shaft, and 22 is a wall penetrated thereby. A ring 23, preferably of metal, is fixed on the shaft 21 by means of a compressed O-ring 24. The ring 23 is provided with an annular groove 25 of the kind characteristic of the invention, this groove corresponding to the groove 10 of FIG. 1. An O-ring 27, which engages the inner frusto-conical surface 26 of the grove 25, is prevented from rolling or sliding off this surface by an opposed fuesto-conical or conoidal surface 28 at its small end. Thus, the frusto-conical surface 28 centers the O-ring 27 and maintains it in registry with the groove 25. This seal functions in the same manner as that shown in FIG. 1.

FIG. 3 shows another embodiment of the invention wherein a housing 41 mounts a spindle 42 by a bearing 43. The bearing is retained in place by a cover 44 having an axial end surface 46 confronting a sealing member 49 which is spaced from the surface 46 by a spacer ring 47.

The main difference between the forms of the invention according to FIGS. 1 and 3 is that the latter form is provided with means 31 for introducing a grease lubricant into the bearing 43. A guide ring 33 forces the grease to pass through the bearing, whereby superfluous and spent grease is forced out of the bearing into an annular space 32 between the cover 44 and the ring 47, and the O-ring 34 is forced aside by the grease, which leaves the housing through the interstice 35 between the members 44 and 49. In order to eliminate any possibility that lubricant which may have been forced past the O-ring 34 into the bottom of the groove 38 may hinder the free movement of the O-ring and thereby prevent it from disengaging the surface against which it slides, an opening, preferably a drilled hole 37, is provided between the bottom of the groove and the surrounding atmosphere. Preferably, the opening is directed substantially radially outward from the grove 38. In order to keep the O-ring from rolling off the outer surface 36 during the assembling operation, the opening of the groove is slightly constricted so that the O-ring must be elastically compressed, to enable it to enter the groove, as is apparent from FIG. 3a.

Tests carried out with centrifugal seals according to the invention have shown that the frusto-conical surface should be at an angle of 10–20° with respect to the axis of the spindle, whereby, even while running, a certain amount of axial movement is permissible between the frusto-conical surface and the transverse sealing surface, since this will not substantially change the sealing pressure or decrease the effectiveness of the seal.

Another advantage with the seal according to the invention is that the sealing surface can be located close to the axis of rotation and thus the peripheral speed and the moment of the frictional forces will both be small.

In order that the seal may function satisfactorily when oil or similar lubricant is used, the distance between the frusto-conical walls of the groove should be 15–20% greater than the diameter of the cross section of the O-ring.

In the form of the invention shown in FIG. 2, the metal ring 23 may be replaced by a ring of plastic or elastic material, such as rubber, in which case the ring can be manufactured cheaply and can be applied without special means for fixing it in place if the diameter of the ring is chosen so that it is kept in place on the spindle by its own tension.

We claim:

1. A centrifugal seal between a first member and a second member rotatable relative thereto, said members having confronting axial end surfaces, characterized by an annular groove in the axial end surface of said rotatable member, the said groove being concentric with the axis of rotation and having co-axial frusto-conical walls, an elastic O-ring sealing element under tension on the inner of said frusto-conical walls whereby when said rotatable member is at rest the said O-ring is urged into continuous sealing engagement with the confronting surface of the other member, the elasticity of said O-ring being such that under the influence of the centrifugal forces at a certain speed, said O-ring will expand into contact with the outer of said frusto-conical walls and thereby be disengaged from the confronting surface.

2. A centrifugal seal according to claim 1 wherein the frusto-conical walls of said annular groove are parallel.

3. A centrifugal seal according to claim 1 wherein said axial end surfaces are parallel and are normal to the rotary axis of said rotatable member.

4. A centrifugal seal according to claim 1 wherein the opening of the annular groove in said axial end surface is somewhat narrower than the diameter of the cross section of the O-ring.

5. A centrifugal seal according to claim 1, wherein the radially inward terminal edge of the inner frusto-conical wall of the groove connects with a centering surface maintaining said ring in registry with said groove upon disassembly of said seal.

6. A centrifugal seal according to claim 5, wherein said centering surface is cylindrical and is disposed intermediate said confronting axial end surfaces.

7. A centrifugal seal according to claim 5, wherein said centering surface is frusto-conical or conoidal, and is opposed to the inner frusto-conical wall of said groove.

8. A centrifugal seal according to claim 1, wherein the bottom of the anular groove is provided with one or more openings leading to the surrounding atmosphere to afford escape of lubricant entering said groove between said O-ring and the walls of said groove.

9. A centrifugal seal according to claim 8, wherein said openings extend substantially radially outward from said groove, whereby said lubricant is purged from said groove by centrifugal action upon rotation of said rotatable member.

References Cited in the file of this patent

UNITED STATES PATENTS

| | | |
|---|---|---|
| 1,482,716 | Sudekum | Feb. 5, 1924 |
| 1,975,170 | Olson | Oct. 2, 1934 |
| 2,089,963 | Johnson | Aug. 17, 1937 |
| 2,427,787 | Hunter | Sept. 23, 1947 |
| 2,467,955 | Berninger | Apr. 19, 1949 |
| 2,478,649 | Wightman | Aug. 9, 1949 |
| 2,494,971 | Summers | Jan. 17, 1950 |

FOREIGN PATENTS

| | | |
|---|---|---|
| 430,846 | Great Britain | June 26, 1935 |